(12) United States Patent
Nagaoka et al.

(10) Patent No.: US 9,447,743 B2
(45) Date of Patent: Sep. 20, 2016

(54) EXHAUST GAS PURIFICATION SYSTEM AND EXHAUST GAS PURIFICATION METHOD

(71) Applicant: ISUZU MOTORS LIMITED, Tokyo (JP)

(72) Inventors: Daiji Nagaoka, Kamakura (JP); Teruo Nakada, Yokohama (JP); Tomohiro Korenaga, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 14/434,206

(22) PCT Filed: Sep. 27, 2013

(86) PCT No.: PCT/JP2013/076347
§ 371 (c)(1),
(2) Date: Apr. 8, 2015

(87) PCT Pub. No.: WO2014/057820
PCT Pub. Date: Apr. 17, 2014

(65) Prior Publication Data
US 2015/0275801 A1    Oct. 1, 2015

(30) Foreign Application Priority Data
Oct. 9, 2012    (JP) .................................. 2012-224063

(51) Int. Cl.
*F01N 3/36*    (2006.01)
*F02D 41/14*    (2006.01)
(Continued)

(52) U.S. Cl.
CPC ....... *F02D 41/1446* (2013.01); *B01D 53/9431* (2013.01); *F01N 3/021* (2013.01);
(Continued)

(58) Field of Classification Search
CPC .... F01N 3/0253; F01N 3/0814; F01N 3/103; F01N 3/106; F01N 3/2033; F01N 3/36; F01N 11/002; F01N 2430/06; F01N 2430/085; F01N 2560/06; F01N 2560/14; F01N 2570/14; F01N 2610/03; F01N 2900/0408; F01N 2900/08; F01N 2900/1404; F01N 2900/1602; F01N 2900/1621; F01N 2900/1626; Y02T 10/47
USPC ......... 60/274, 284, 285, 286, 295, 297, 300, 60/301, 303, 311, 320
See application file for complete search history.

(56) References Cited

U.S. PATENT DOCUMENTS

2010/0101218 A1* 4/2010 Gabe .................. F01N 13/0093
                                                                60/286
2010/0307132 A1   12/2010 Yuza et al.
(Continued)

FOREIGN PATENT DOCUMENTS

CN    101732992    6/2010
CN    101946077    1/2011
(Continued)

OTHER PUBLICATIONS

Japan Platform for Patent Information English Abstract of Japanese Publication No. 2008-128170, Published Jun. 5, 2008.
(Continued)

*Primary Examiner* — Thomas Denion
*Assistant Examiner* — Jorge Leon, Jr.
(74) *Attorney, Agent, or Firm* — Staas & Halsey LLP (57) ABSTRACT

Exhaust gas of an internal combustion engine is made to pass through an exhaust gas purification device after passing through a pre-oxidation catalyst. When a first temperature of the exhaust gas on an upstream side of the device is lower than a first set temperature, multistage temperature rise injection is performed. When the first temperature becomes the first set temperature or more, post injection is performed in addition to the multistage temperature rise injection, and feedback control of the post injection is executed so that a second temperature of the exhaust gas on a downstream side of the exhaust gas purification device becomes a second set temperature.

4 Claims, 7 Drawing Sheets (51) Int. Cl.
  F02D 41/02    (2006.01)
  F02D 41/40    (2006.01)
  B01D 53/94    (2006.01)
  F01N 3/021    (2006.01)
  F01N 3/08     (2006.01)
  F01N 9/00     (2006.01)
  F01N 3/10     (2006.01)
  F01N 3/20     (2006.01)
  F01N 11/00    (2006.01)
  F01N 3/025    (2006.01)

(52) U.S. Cl.
  CPC ........... *F01N 3/025* (2013.01); *F01N 3/0814* (2013.01); *F01N 3/106* (2013.01); *F01N 3/36* (2013.01); *F01N 9/00* (2013.01); *F02D 41/024* (2013.01); *F02D 41/027* (2013.01); *F02D 41/405* (2013.01); *F01N 3/0253* (2013.01); *F01N 3/103* (2013.01); *F01N 3/2033* (2013.01); *F01N 11/002* (2013.01); *F01N 2430/06* (2013.01); *F01N 2430/085* (2013.01); *F01N 2560/06* (2013.01); *F01N 2560/14* (2013.01); *F01N 2570/14* (2013.01); *F01N 2610/03* (2013.01); *F01N 2900/0408* (2013.01); *F01N 2900/08* (2013.01); *F01N 2900/1404* (2013.01); *F01N 2900/1602* (2013.01); *F01N 2900/1621* (2013.01); *F01N 2900/1626* (2013.01); *F02D 41/029* (2013.01); *F02D 41/0275* (2013.01); *F02D 2200/021* (2013.01); *Y02T 10/26* (2013.01); *Y02T 10/44* (2013.01); *Y02T 10/47* (2013.01)

(56) References Cited

U.S. PATENT DOCUMENTS

| | | | |
|---|---|---|---|
| 2012/0227386 A1 | 9/2012 | Fuse | |
| 2013/0333351 A1* | 12/2013 | Vyas | F02D 41/0245 60/274 |

FOREIGN PATENT DOCUMENTS

| | | |
|---|---|---|
| CN | 102803674 | 11/2012 |
| DE | 102009053491 A1 | 5/2010 |
| JP | 2008-128170 | 6/2008 |
| JP | 2008-267291 | 11/2008 |
| JP | 2009-203866 | 9/2009 |
| JP | 2009-243362 | 10/2009 |
| JP | 2009-250135 | 10/2009 |
| JP | 2010-31833 | 2/2010 |
| JP | 2010-121473 | 6/2010 |
| JP | 2011-163250 | 8/2011 |
| JP | 2011-247130 | 12/2011 |
| JP | 2012-127297 | 7/2012 |
| JP | 5152413 | 12/2012 |
| WO | 2009/107298 A1 | 9/2009 |
| WO | 2261489 A1 | 12/2010 |
| WO | 2012/081460 A1 | 6/2012 |
| WO | 2012/107949 A1 | 8/2012 |

OTHER PUBLICATIONS

Japan Platform for Patent Information English Abstract of Japanese Publication No. 2008-267291, Published Nov. 6, 2008.
Japan Platform for Patent Information English Abstract of Japanese Publication No. 2009-203866, Published Sep. 10, 2009.
Japan Platform for Patent Information English Abstract of Japanese Publication No. 2009-243362, Published Oct. 22, 2009.
Japan Platform for Patent Information English Abstract of Japanese Publication No. 2009-250135, Published Oct. 29, 2009.
Japan Platform for Patent Information English Abstract of Japanese Publication No. 2010-31833, Published Feb. 12, 2010.
Japan Platform for Patent Information English Abstract of Japanese Publication No. 2010-121473, Published Jun. 3, 2010.
Japan Platform for Patent Information English Abstract of Japanese Publication No. 2011-163250, Published Aug. 25, 2011.
Japan Platform for Patent Information English Abstract of Japanese Publication No. 2011-247130, Published Dec. 8, 2011.
Japan Platform for Patent Information English Abstract of Japanese Publication No. 2012-127297, Published Jul. 5, 2012.
Bibliography only of Australian Application No. 2008351759 A1, which is a family patent member of References AA, AE, AO, AR, & AU.
International Search Report mailed on Dec. 17, 2013 in corresponding International Patent Application No. PCT/JP2013/076347.

* cited by examiner

EXHAUST GAS PURIFICATION SYSTEM AND EXHAUST GAS PURIFICATION METHOD

CROSS-REFERENCE TO RELATED APPLICATIONS

This application is a U.S. National Stage Application, which claims the benefit under 35 U.S.C. §371 of PCT International Patent Application No. PCT/JP2013/076347, filed Sep. 27, 2013, which claims the foreign priority benefit under 35 U.S.C. §119 of Japanese Patent Application No. 2012-224063, filed Oct. 9, 2012, the contents of which are incorporated herein by reference.

TECHNICAL FIELD

The present invention relates to an exhaust gas purification system and an exhaust gas purification method which can improve low temperature characteristics of an exhaust gas purification device including a pre-stage oxidation catalyst and at least one of an NOx purification catalyst and a DPF so that an NOx purification rate at a low temperature can be improved and generation of white smoke can be prevented.

BACKGROUND ART

In an internal combustion engine such as diesel engines, a part of gasoline engines and the like, an NOx purification catalyst (deNOx catalyst) and a DPF (Diesel Particulate Filter) are used in order to reduce NOx (nitrogen oxide) and PM (particulate matter) in an exhaust gas.

The NOx purification catalysts include a lean NOx trap catalyst (LNT catalyst), a selective reduction catalyst (SCR catalyst) and the like, and one of the lean NOx trap catalysts is an NOx occlusion reduction catalyst. The NOx occlusion reduction catalyst is a catalyst carrying an NOx occlusion material occluding NOx and precious metal, and if an air/fuel ratio of an inflow exhaust gas is in a lean (hyperoxia) state and oxygen ($O_2$) concentration in an atmosphere is high, nitric oxide (NO) in the exhaust gas is oxidized on the precious metal so as to become nitrogen dioxide ($NO_2$), and the nitrogen dioxide is combined with the NOx occlusion material such as barium (Ba) so as to become a nitrate ($Ba_2NO_4$) and the like and to be occluded.

Moreover, if the air/fuel ratio of the exhaust gas flowing into the NOx occlusion reduction catalyst becomes a theoretical air/fuel ratio or enters a rich (low oxygen concentration) state and the oxygen concentration in the atmosphere lowers, the NOx occlusion material is combined with carbon monoxide (CO), the nitrate is dissolved, and nitrogen dioxide is emitted. The emitted nitrogen dioxide is reduced by unburned hydrocarbon (HC), carbon monoxide and the like contained in the exhaust gas by a three-way function of the precious metal so as to become nitrogen ($N_2$), while components in the exhaust gas are emitted into the atmospheric air as harmless substances such as carbon dioxide ($CO_2$), water ($H_2O$), and nitrogen.

Thus, in the exhaust gas purification system including the NOx occlusion reduction catalyst, when an NOx occlusion capability gets closer to saturation, control in which the air/fuel ratio of the exhaust gas is brought into a rich state so as to lower the oxygen concentration of the inflow exhaust gas, that is, rich control for recovering the NOx occlusion capability is executed so that an NOx regeneration operation for emitting the adsorbed NOx and reducing the emitted NOx to nitrogen by the precious metal is performed.

Since catalysts including the NOx occlusion reduction catalyst need to be at an activation temperature or more in general so as to activate its catalytic action, a catalytic reaction is not promoted at a low temperature at which the catalyst is not activated, which results in a problem that NOx purification catalysts such as the NOx occlusion reduction catalyst and a selective reduction catalyst has a low NOx purification rate.

In order to improve the NOx purification rate in the catalyst at a low temperature, temperature rise control of the exhaust gas is examined also in exhaust gas treatment of a diesel engine. The temperature rise control is control for raising an exhaust gas temperature by multistage temperature rise injection (multi injection) which is a combination of pre injection (pilot injection), main injection, after injection and the like so as to keep a combustion temperature in a cylinder (in-cylinder) of an expansion stroke at a top dead center and after of a piston at a high temperature. By means of the temperature rise control, the exhaust gas temperature can be raised in an early stage, and activation of the catalyst of the exhaust gas purification device disposed in an exhaust passage can be expedited.

Moreover, in the exhaust gas purification system including a DPF for collecting PM in the exhaust gas, when a PM collection amount gets closer to an amount that can be collected by the DPF (an amount in a saturated state), PM regeneration control in which a temperature of the DPF is raised to a temperature at which the collected PM starts combustion or more in order to recover the PM collection capability and to burn/remove the PM is executed. In the temperature rise of the DPF, temperature rise control in which the temperature of the exhaust gas flowing into the DPF is raised so as to raise the temperature of the DPF by the exhaust gas at a high temperature is executed.

However, in the temperature rise control of the exhaust gas during cooling, most of the fuel injected into the cylinder by the temperature rise control of the multistage temperature rise injection is burned in the cylinder, but unburned hydrocarbon (HC) passes through the exhaust gas purification device as it is in some cases. That is, when the temperature rise control of the exhaust gas is executed, if the temperature of the catalyst provided in the exhaust passage is at a catalyst activation temperature or less, there is a problem that the unburned hydrocarbon discharged from the cylinder reaches a tail pipe in a last part of the exhaust passage and flows out (slip) into the air and is emitted into the air.

The HC slip is likely to occur not only during cooling in the NOx purification catalyst and NOx regeneration in the NOx occlusion reduction catalyst but also in PM regeneration for burning/removing the PM in the DPF at a low load of the engine.

For example, as described in Japanese patent application Kokai publication No. 2010-31833, in order to reduce emission of the HC (hydrocarbon) into the air, in an exhaust gas purification device with a configuration of a pre-stage oxidation catalyst (DOC) and a DPF for performing DOC temperature rise by early post injection and DPF temperature rise by oxidation reaction heat in DOC of an unburned component supplied by late post injection, an exhaust gas purification device of a diesel engine for suppressing rapid rise of an injection amount of the late post injection and preventing the HC slip by giving a certain period of time of delay to a target late post injection amount is proposed.

However, when such DOC is used, the DOC for oxidizing the unburned component (unburned hydrocarbon) in the exhaust gas needs to cover the entire operation region of the internal combustion engine and thus, size reduction is difficult, and there is limitation in installation close to the engine body. Moreover, if exhaust pipe direct injection is used, since a certain period of time is needed for evaporation of the injected fuel, and if an interval between an HC injection valve nozzle (exhaust pipe direct injection device) and the DOC is small, soot is generated by partial oxidation (cracking) of the fuel on a front surface of the DOC and blocking might be caused and thus, the interval between the HC injection nozzle and the DOC needs to be taken as large as 1 m or more, for example.

For these reasons, too, the DOC cannot be arranged close to the engine body and thus, the temperature falls due to heat radiation before the exhaust gas discharged from inside the cylinder reaches the DOC. Thus, at a low temperature, the unburned HC in the exhaust gas cannot be sufficiently oxidized by the DOC, and HC slip will occur.

As a measure against the HC slip at a low temperature, as described in Japanese patent application Kokai publication No. 2011-163250, for example, in an exhaust gas purification device with a configuration of the pre-stage oxidation catalyst (DOC) and a DPF for performing the DOC temperature rise by early post injection and the DPF temperature rise by oxidation reaction heat in DOC of an unburned component supplied by late post injection, in order to prevent emission of the unburned HC component in large quantity to an outside until the DOC reaches the active temperature after the early post injection, an exhaust gas treatment method and device of an internal combustion engine for promoting activation of the DOC and for reducing the HC slip by increasing a load of a diesel engine through an increase in power of an oil circulation pump and increasing an exhaust gas temperature rise gradient in a DOC temperature rise stage until start of the early post injection is proposed. However, with this exhaust gas treatment method and device, the load of the diesel engine is increased in order to raise the temperature in the cylinder of the internal combustion engine at low-temperature start, and thus there is a concern of deterioration of fuel consumption.

PRIOR ART DOCUMENT

Patent Document 1: Japanese patent application Kokai publication No. 2010-31833
Patent Document 2: Japanese patent application Kokai publication No. 2011-163250

SUMMARY OF THE INVENTION

The present invention was made in order to solve the above-described problems and has an object to provide an exhaust gas purification system and an exhaust gas purification method which can improve low-temperature characteristics of an exhaust gas purification device including a pre-stage oxidation catalyst (DOC) and at least one of an NOx purification catalyst and a DPF, improve NOx purification characteristics of the NOx purification catalyst with respect to a low-temperature exhaust gas and prevent generation of white smoke caused by HC slip in NOx purification at a low temperature, NOx regeneration or PM regeneration.

An exhaust gas purification system to achieve the above-described objects is configured such that, in an exhaust gas purification system including: an exhaust gas purification device including a pre-stage oxidation catalyst and at least one of an NOx purification catalyst and a DPF provided in an exhaust passage of an internal combustion engine; and a control device configured to control an operation of the internal combustion engine, a first exhaust gas temperature sensor, a pre-oxidation catalyst, and a second exhaust gas temperature sensor are configured to be arranged in order from an upstream side in the exhaust passage on the upstream side of the exhaust gas purification device; and the control device is configured to execute first control to perform multistage temperature rise injection by in-cylinder combustion control when a first temperature detected by the first exhaust gas temperature sensor is lower than a first set temperature set in advance, perform post injection in addition to the multistage temperature rise injection when the first temperature rises to the first set temperature or more, and feedback control the post injection so that a second temperature detected by the second exhaust gas temperature sensor becomes a second set temperature set in advance.

According to this configuration, since the exhaust gas at a temperature higher than the exhaust gas flowing into the pre-stage oxidation catalyst is made to flow into a pre-oxidation catalyst (Pre-DOC) arranged closer to an inside of a cylinder (in-cylinder) on the upstream side than the exhaust gas purification device including the pre-stage oxidation catalyst (DOC) and at least one of the NOx purification catalyst and the DPF so as to be activated easily, unburned HC in the exhaust gas flowing out of an inside of the cylinder by the multistage temperature rise injection in the cylinder can be oxidized by the pre-oxidation catalyst efficiently, and while the HC slip is prevented, the temperatures of the exhaust gas, the pre-stage oxidation catalyst, the NOx purification catalyst, the DPF and the like can be efficiently raised by oxidation heat of HC oxidized by the pre-oxidation catalyst so that improvement of an NOx purification rate and improvement of the efficiency of the DPF regeneration can be realized.

The pre-oxidation catalyst is mainly for oxidizing HC and CO immediately after being discharged from inside the cylinder, and since it is only necessary to perform a temperature rise function of the exhaust gas only if the operation state of the internal combustion engine is in an idle state, the exhaust gas temperature at a low load is low and an exhaust gas amount is small, its size can be reduced. For example, regarding the capacity, it can be formed by a small-sized oxidation catalyst having an SV value of a space velocity approximately at 100,000/h ($hr^{-1}$).

Since the pre-oxidation catalyst can be made small, it can be installed near the engine body of the internal combustion engine as close to it as possible. Since the entire operation region of the internal combustion engine cannot be covered only by the pre-oxidation catalyst, a range that cannot be covered is covered by the pre-stage oxidation catalyst (DOC). Thus, the pre-stage oxidation catalyst of the exhaust gas purification device is also needed.

In this configuration, first, the multistage temperature rise injection or post injection is performed in the cylinder so as to oxidize HC in the exhaust gas discharged from inside the cylinder by the pre-oxidation catalyst and to raise the temperature of the exhaust gas. That is, the temperature of the pre-oxidation catalyst is raised to a catalyst activation temperature or more in an early stage by the multistage temperature rise injection, and after the temperature rise, HC supplied by the post injection is oxidized by the pre-oxidation catalyst, and the temperature of the exhaust gas is raised. As a result, the temperature of the pre-stage oxidation catalyst of the exhaust gas purification device can be raised.

In this case, since the catalyst can be installed at a position near the engine body and the temperature of the small-sized pre-oxidation catalyst with a small heat capacity rises in an extremely early stage to the catalyst activation temperature or more, HC can be efficiently oxidized from an extremely early stage even at a low-temperature start. The multistage temperature rise injection here is in-cylinder fuel injection composed of pre injection, main injection, and after injection.

In the above-described exhaust gas purification system, the exhaust gas purification device is configured by including the NOx purification catalyst, and in the control device, the first set temperature is set to a catalyst activation temperature of the pre-oxidation catalyst and the second set temperature is set to a temperature at which the catalyst activity of the NOx purification catalyst is favorable; and the control device is configured to execute the first control when a temperature of cooling water of the internal combustion engine is lower than a cooling water set temperature set in advance, and execute control of finishing the multistage temperature rise injection and the post injection when the second temperature is able to maintain the second set temperature as the result of execution of the first control, is executed.

The temperature at which the catalyst activity of the NOx purification catalyst is favorable is a temperature not less than the catalyst activation temperature of the NOx purification catalyst and is one temperature in a temperature range in which the NOx purification rate is relatively high. For example, the temperature at which the NOx purification rate is the highest or the temperature at which the NOx purification rate is within an allowable range and which is the most preferable from the viewpoint of a life of the NOx purification catalyst and the like.

According to this configuration, during cold start of the internal combustion engine, while it is determined whether the state is cooling or warm-up by the cooling water temperature, HC slip which is likely to occur by the multistage temperature rise injection can be prevented by the pre-oxidation catalyst and the first control in the cooling state and thus, the multistage temperature rise injection can be performed even in the cooling, and early temperature rise of the exhaust gas, the pre-stage oxidation catalyst, and the NOx purification catalyst can be realized by the first control during cooling, and the NOx purification rate in the NOx purification catalyst can be improved.

Moreover, in the above-described exhaust gas purification system, the exhaust gas purification device is configured by including the DPF, an exhaust pipe fuel injection device and a third exhaust gas temperature sensor for detecting a temperature of the exhaust gas flowing into the DPF are configured to be arranged in the exhaust passage on the upstream side of the DPF, and in the control device, the first set temperature is set to a catalyst activation temperature of the pre-oxidation catalyst, the second set temperature is set to a temperature at which the fuel injected from the exhaust pipe fuel injection device is decomposed, and the third set temperature is set to a temperature at which particulate matters collected by the DPF become combustible; and the control device is configured to execute the first control at a low load of the internal combustion engine, and when the second temperature is able to maintain the second set temperature as the result of execution of the first control, to execute control to start fuel injection from the exhaust pipe fuel injection device, perform feedback control of the exhaust pipe fuel injection so that a third temperature detected by the third exhaust gas temperature sensor becomes the third set temperature, determine whether or not the particulate matters collected by the DPF during execution of the feedback control have been burned/removed, and finish the multistage temperature rise injection and the post injection when having determined that the particulate matters collected by the DPF have been burned/removed.

According to this configuration, since the HC slip which is likely to occur by the multistage temperature rise injection during PM regeneration of the DPF when the operation state of the internal combustion engine is in a low load state can be prevented by the pre-oxidation catalyst and the first control, the multistage temperature rise injection can be made possible even at a low load, and the temperature of the exhaust gas can be made to reach by the first control to a temperature at which the fuel to be injected by the exhaust pipe fuel injection device is decomposed in an early stage, an effect of preventing the HC slip can be obtained and at the same time, an effect of promoting the temperature rise of the DPF in the PM regeneration can be obtained so as to raise the temperature of the DPF early, and the PM can be efficiently removed.

Moreover, the pre-oxidation catalyst has a greater effect when being combined with the exhaust pipe fuel injection device. That is, since a certain period of time is needed for evaporating the injected fuel, an interval between the exhaust pipe fuel injection device and the pre-stage oxidation catalyst needs to be taken as wide as 1 m or more, for example, and the pre-stage oxidation catalyst is arranged at a position spaced away from the engine body, but the pre-oxidation catalyst arranged on the upstream side of the exhaust pipe fuel injection device is close to the engine body, and a high-temperature exhaust gas discharged from inside the cylinder flows in and thus, when the temperature rise of the exhaust gas flowing into the exhaust gas purification device is necessary, the temperature of the pre-oxidation catalyst can be raised to the catalyst activation temperature or more in an early stage, and the HC supplied by the post injection can be oxidized in an early stage and thus, the temperature of the exhaust gas can be raised rapidly.

The exhaust gas purification method to achieve the above-described object is an exhaust gas purification method for purifying an exhaust gas discharged from an internal combustion engine by passing it through an exhaust gas purification device including a pre-stage oxidation catalyst and at least one of an NOx purification catalyst and a DPF, characterized in that the exhaust gas is made to pass through the exhaust gas purification device after passing through a pre-oxidation catalyst; and first control is executed which performs multistage temperature rise injection by in-cylinder combustion control when a first temperature detected by a first exhaust gas temperature sensor on the upstream side of the exhaust gas purification device is lower than a first set temperature set in advance, performs post injection in addition to the multistage temperature rise injection when the first temperature rises to the first set temperature or more, and feedback-controls the post injection so that a temperature detected by a second exhaust gas temperature sensor on the downstream side of the exhaust gas purification device becomes a second set temperature set in advance.

According to this method, since it is configured such that the exhaust gas at a temperature higher than the exhaust gas flowing into the pre-stage oxidation catalyst is made to flow into the pre-oxidation catalyst arranged closer to the inside of the cylinder (in-cylinder) on the upstream side than the exhaust gas purification device including the pre-stage oxidation catalyst and at least one of the NOx purification catalyst and the DPF and is activated easily, the unburned HC in the exhaust gas flowing out from inside the cylinder can be efficiently oxidized by the multistage temperature rise injection in the cylinder by the pre-oxidation catalyst, and while the HC slip is prevented, the temperatures of the exhaust gas, the pre-stage oxidation catalyst, the NOx purification catalyst, the DPF and the like can be efficiently raised by oxidation heat of HC oxidized by the pre-oxidation catalyst so that improvement of an NOx purification rate and improvement of efficiency of the DPF regeneration can be realized.

In the above-described exhaust gas purification method, the exhaust gas is made to pass through the exhaust gas purification device including the NOx purification catalyst, and the first set temperature is set to a catalyst activation temperature of the pre-oxidation catalyst, and the second set temperature is set to a temperature at which catalyst activity of the NOx purification catalyst is favorable; and the first control is executed when a temperature of cooling water of the internal combustion engine is lower than a cooling water set temperature set in advance, and the multistage temperature rise injection and the post injection are finished when the second temperature is able to maintain the second set temperature as the result of execution of the first control.

According to this method, during cold start of the internal combustion engine, while it is determined whether the state is cooling or warm-up by the cooling water temperature, HC slip which is likely to occur by the multistage temperature rise injection can be prevented by the pre-oxidation catalyst and the first control in the cooling state and thus, the multistage temperature rise injection can be performed even in the cooling, and early temperature rise of the exhaust gas, the pre-stage oxidation catalyst, and the NOx purification catalyst can be realized by the first control during cooling, and the NOx purification rate in the NOx purification catalyst can be improved.

Moreover, in the above-described exhaust gas purification method, the exhaust gas is made to pass through the exhaust gas purification device including the DPF; the first set temperature is set to a catalyst activation temperature of the pre-oxidation catalyst, the second set temperature is set to a temperature at which the fuel injected from the exhaust pipe fuel injection device is decomposed, and a third set temperature is set to a temperature at which particulate matters collected by the DPF become combustible; the first control is executed at a low load of the internal combustion engine; and fuel injection is started from the exhaust pipe fuel injection device provided on an upstream of the exhaust gas purification device when the second temperature is able to maintain the second set temperature as the result of execution of the first control, feedback control of the exhaust pipe fuel injection is executed so that a third temperature detected by a third exhaust gas temperature sensor arranged on the upstream of the DPF becomes the third set temperature, it is determined whether or not the particulate matters collected by the DPF during execution of the feedback control have been burned/removed, and the multistage temperature rise injection and the post injection are finished when it is determined that the particulate matters collected by the DPF have been burned/removed.

According to this method, since the HC slip which is likely to occur by the multistage temperature rise injection during PM regeneration of the DPF when the operation state of the internal combustion engine is in a low load state can be prevented by the pre-oxidation catalyst and the first control, the multistage temperature rise injection can be made possible even at a low load, and the temperature of the exhaust gas can be made to reach by the first control to a temperature at which the fuel to be injected by the exhaust pipe fuel injection device is decomposed in an early stage, the effect of preventing the HC slip can be obtained and at the same time, the effect of promoting the temperature rise of the DPF in the PM regeneration can be obtained so as to raise the temperature of the DPF early, and the PM can be efficiently removed.

According to the exhaust gas purification system and the exhaust gas purification method according to the present invention, by employing arrangement of installing the pre-oxidation catalyst on the upstream of the exhaust gas purification device including the pre-stage oxidation catalyst and at least one of the NOx purification catalyst and the DPF and by controlling the multistage temperature rise injection and the post injection by the first control, temperature rise of the exhaust gas, the pre-stage oxidation catalyst, the NOx purification device, the DPF and the like can be achieved in an early stage when the temperature of the exhaust gas is low, NOx purification, NOx regeneration, and DPF regeneration can be performed efficiently.

DETAILED DESCRIPTION

An exhaust gas purification system and an exhaust gas purification method of an embodiment according to the present invention will be described below by referring to the attached drawings.

Figure 1:
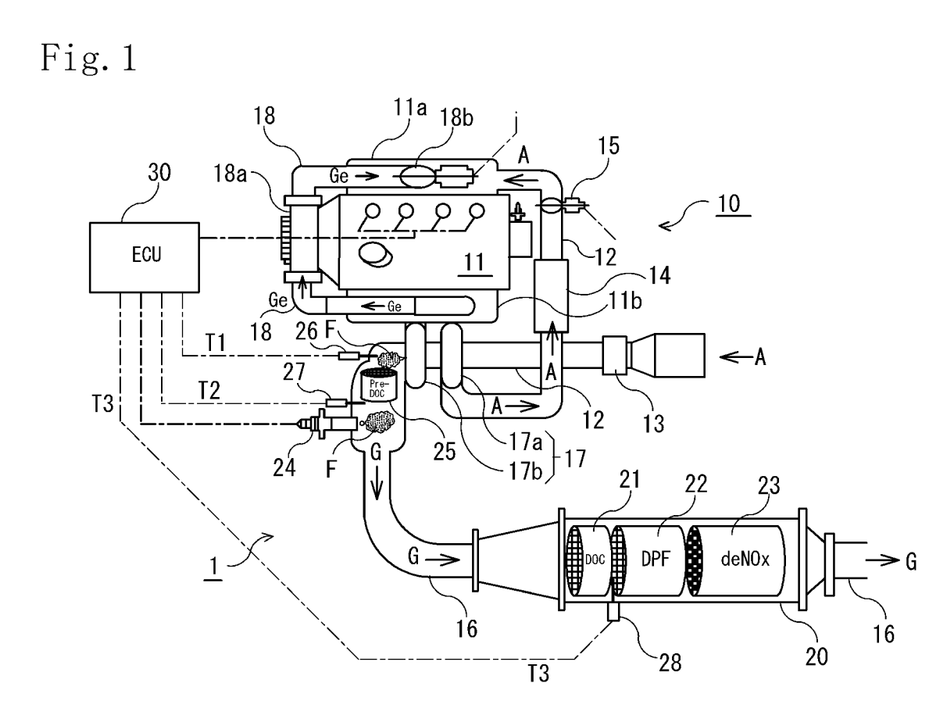
FIG. 1 is a diagram illustrating a configuration of an exhaust gas purification system of a first embodiment according to the present invention.

FIG. 1 illustrates a configuration of an exhaust gas purification system 1 of a first embodiment according to the present invention.

The exhaust gas purification system 1 is a system for purifying an exhaust gas G of an engine (internal combustion engine) 10, and the engine 10 is configured by having an engine body 11, an intake passage 12 connected to an intake manifold 11a of this engine body 11, an exhaust passage 16 connected to an exhaust manifold 11b of the engine body 11, and an EGR passage 18 connecting the exhaust passage 16 and the intake passage 12.

In the intake passage 12 through which an intake air A passes, an intake air amount sensor (MAF) 13, a compressor 17a of a turbo supercharger 17, an intercooler 14, an intake valve 15 and the like are disposed in order from an upstream side, and in the exhaust passage 16 through which the exhaust gas G passes, a turbine 17b of the turbo supercharger 17, an HC injection nozzle (an exhaust pipe fuel injection device) 24, an exhaust gas purification device 20 and the like are disposed in order from the upstream side. Moreover, in the EGR passage 18 through which an EGR gas Ge passes, an EGR cooler 18a and an EGR valve 18b are disposed in order from the upstream side.

Moreover, the exhaust gas purification device 20 is configured by including a pre-stage oxidation catalyst (DOC) 21, a DPF (Diesel Particulate Filter) 22, and an NOx purification catalyst (deNOx catalyst) 23 in order from the upstream side. As the NOx purification catalyst 23, an NOx occlusion reduction catalyst (LNT catalyst), a selective reduction catalyst (SCR catalyst) or the like can be used.

In the present invention, in the exhaust gas purification system 1 in FIG. 1, a small-sized pre-oxidation catalyst (pre-DOC) 25 is arranged between the turbine 17b and the HC injection nozzle 24, and hydrocarbon (HC) flowing out (slipping) from inside a cylinder is oxidized by the pre-oxidation catalyst 25 so as to raise a temperature of the exhaust gas by the oxidation heat of the hydrocarbon.

A capacity of the small-sized pre-oxidation catalyst 25 is set to a capacity such that catalyst activity can be generally ensured, and HC can be oxidized efficiently in a range of a flow rate of the exhaust gas when an operation state of the engine 10 is from an idle operation state to a low-load operation state and an SV value of a space velocity is approximately 100,000/h ($hr^{-1}$). The space velocity is obtained by dividing a gas flow velocity ($Nm^3/h$) by a catalyst amount ($m^3$).

On the other hand, a capacity of the pre-stage oxidation catalyst 21 needs to be formed to be a capacity such that HC can be oxidized efficiently even for the maximum flow rate of the exhaust gas over an entire range of the operation state of the engine 10 so that the entire range of the operation state can be covered, and thus the capacity of the pre-stage oxidation catalyst 21 is larger than that of the pre-oxidation catalyst 25.

In other words, the size of the pre-oxidation catalyst 25 can be made smaller than that of the pre-stage oxidation catalyst 21. Since the pre-oxidation catalyst 25 can be disposed on a side closer to the engine body 11 than the pre-stage oxidation catalyst 21 by means of this size reduction, before the temperature of the exhaust gas G discharged from inside the cylinder falls by heat radiation of the exhaust passage 16, the exhaust gas G at a high temperature can be made to flow into the pre-oxidation catalyst 25 so as to raise and maintain the temperature of the pre-oxidation catalyst 25 at the catalyst activation temperature or more so that HC and CO can be oxidized.

Moreover, a first exhaust gas temperature sensor 26 is arranged on an upstream side of the pre-oxidation catalyst 25, and a second exhaust gas temperature sensor 27 is arranged on a downstream side of the pre-oxidation catalyst 25. Furthermore, a third exhaust gas temperature sensor 28 is arranged between the pre-stage oxidation catalyst 21 and the DPF 22 of the exhaust gas purification device 20, that is, on the upstream of the DPF 22.

Then, a control device 30 called an engine control unit (ECU) executing control of the engine in general is provided. The control device 30 is configured to control in-cylinder fuel injection of the engine 10 by inputting temperatures T1, T2, and T3 detected by the respective exhaust gas temperature sensors 26, 27, and 28, a cooling water temperature Tw detected by a cooling water temperature sensor (not shown), and a rotation speed Ne and a load Q of the engine 10.

The control device 30 is configured by including the following first control, second control, and third control in its control. The first control is control relating to activation of the pre-oxidation catalyst 25, and performs multistage temperature rise injection (multi injection for temperature rise) composed of pre injection (pilot injection), main injection, and after injection in the in-cylinder fuel injection if the first temperature T1 detected by the first exhaust gas temperature sensor 26 is lower than a first set temperature T1c set in advance as illustrated in control flows in FIGS. 2 and 3. Moreover, the first control, when the first temperature T1 becomes the first set temperature Tc1 or more, executes feedback control to perform the post injection in addition to the multistage temperature rise injection so as to oxidize unburned HC supplied by the post injection by the pre-oxidation catalyst 25 so that the second temperature T2 detected by the second exhaust gas temperature sensor 27 becomes a second set temperature T2c set in advance.

In the first control, the first set temperature T1c is set to a catalyst activation temperature (approximately 200° C.) of the pre-oxidation catalyst 25. As a result, the temperature of the exhaust gas G is raised by the multistage temperature rise injection until the pre-oxidation catalyst 25 is activated, and the temperature of the pre-oxidation catalyst 25 can be raised by the exhaust gas G whose temperature has been raised, and after the temperature of the pre-oxidation catalyst 25 has been raised to the catalyst activation temperature or more, HC supplied by the post injection is oxidized by a catalytic action of the pre-oxidation catalyst 25 so as to raise the temperature of the exhaust gas G, and the second temperature T2 of the exhaust gas G can be made the second set temperature Tc2 meeting a demand of the exhaust gas purification device 20 on the downstream side of the pre-oxidation catalyst 25.

Figure 2:
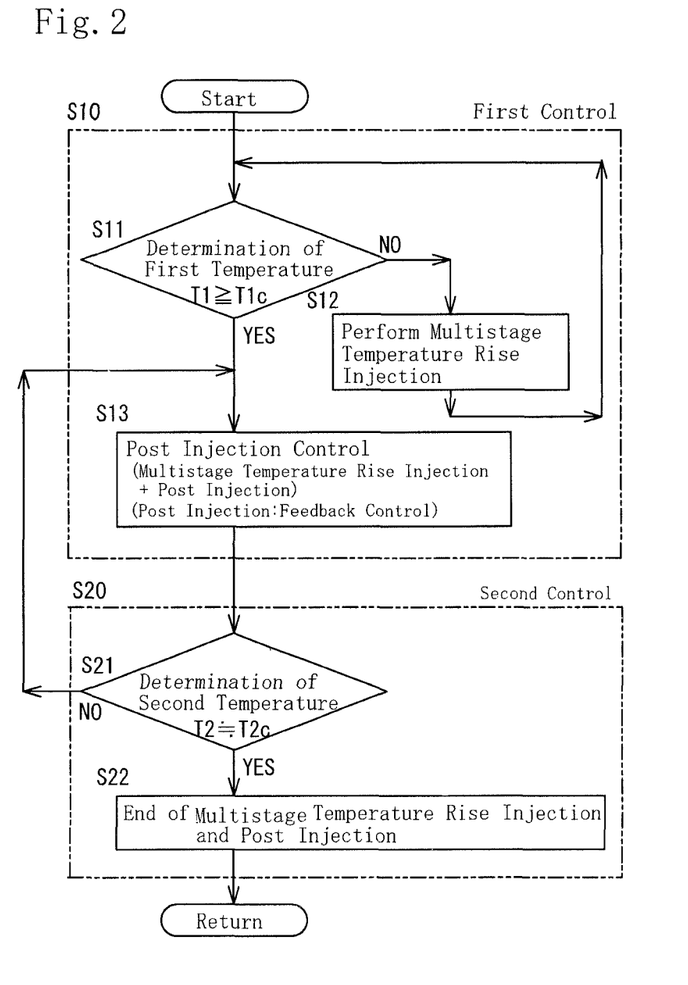
FIG. 2 is a diagram illustrating a flow of first control and second control according to the present invention.

Moreover, the second control is control for the NOx purification catalyst 23 and is control, as illustrated in a control flow in FIG. 2, to determine whether or not the temperature Tw of the cooling water of the engine 10 is lower than a cooling water set temperature Twc (water temperature at 40° C., for example) set in advance and when having determined to be lower, execute the first control by assuming the state to be a cooling state, and when the second temperature T2 is able to maintain the second set temperature T2c by the first control, to finish the multistage temperature rise injection and the post injection by assuming that the cooling state has changed to a warm-up state. In the second control, the second set temperature T2c is set to the catalyst activation temperature (approximately 300° C.) of the NOx purification catalyst 23.

Figure 3:
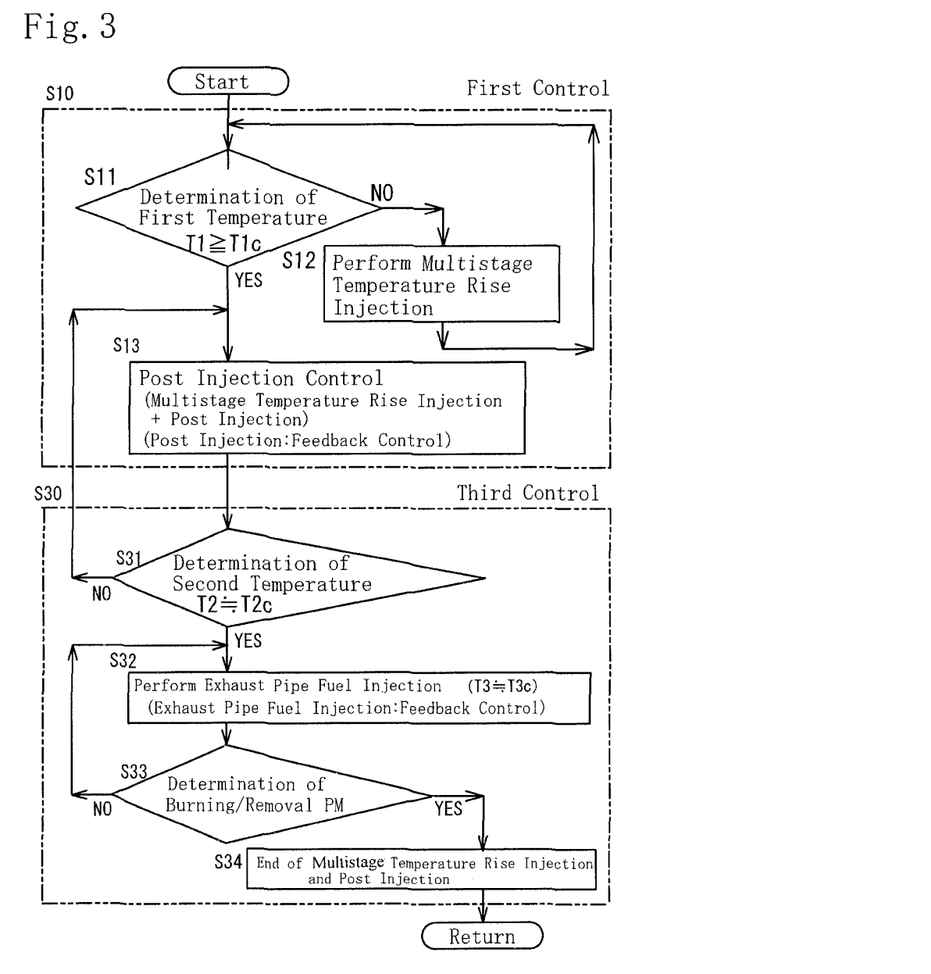
FIG. 3 is a diagram illustrating a flow of the first control and third control according to the present invention.

Moreover, the third control is control for the DPF 22, and is control, as illustrated in a control flow in FIG. 3, to determine whether or not the operation state of the engine 10 is in a low load state set in advance and execute the first control when having determined to be in the low load state, and when the second temperature T2 is able to maintain the second set temperature T2c by the first control, to start injection of a fuel F from the HC injection nozzle 24 and execute feedback control so that the third temperature T3 detected by the third exhaust gas temperature sensor 28 becomes the third set temperature T3c, to determine whether or not the PM (particulate matter) collected by the DPF 22 during execution of this feedback control has been burned/removed, and to finish the multistage temperature rise injection and the post injection when having determined that the PM has been burned/removed. In the third control, the second set temperature T2c is set to a temperature (approximately 300° C.) at which the fuel F injected from the HC injection nozzle 24 is decomposed, and the third set temperature T3c is set to a temperature (approximately 500 to 600° C.) at which the PM collected by the DPF 22 becomes combustible.

Subsequently, the exhaust gas purification method in the above-described exhaust gas purification system 1 will be described. The exhaust gas purification method includes a method for executing control for the NOx purification catalyst 23 of "first control+second control" as illustrated in FIG. 2 and a method for executing control for regenerating the DPF 22 of "first control+third control" as illustrated in FIG. 3. FIGS. 2 and 3 illustrate their control flows, and the control flows in FIGS. 2 and 3 illustrate that they are called from a high-level control flow as necessary at start of the engine 10, Step S11 to Step S22 or Step S11 to Step S33 are executed, and back to the high-level control flow, they are repeatedly executed as necessary, and when the engine 10 is stopped, they are finished together with the high-level control flow.

The method for the NOx purification catalyst 23 is a method for improving the NOx purification rate of the NOx purification catalyst 23 immediately after cold start and is performed when the temperature Tw of the cooling water of the engine 10 is lower than the cooling water set temperature Twc set in advance. In this method, the first set temperature T1c is set to the catalyst activation temperature (approximately 200° C.) of the pre-oxidation catalyst 25, and the second set temperature T2c is set to a temperature (approximately 300° C.) at which the catalyst activity of the NOx purification catalyst 23 is favorable.

The method is an exhaust gas purification method in which the exhaust gas G discharged from the engine 10 is made to pass through the exhaust gas purification device 20 including the pre-stage oxidation catalyst 21 and the NOx purification catalyst 23 for purification, and the exhaust gas G is made to pass through the pre-oxidation catalyst 25 before passing through the exhaust gas purification device 20.

At the same time, in accordance with the control flow as illustrated in FIG. 2, it is determined at Step S11 whether or not the first temperature T1 detected by the first exhaust gas temperature sensor 26 on the upstream side of the exhaust gas purification device 20 is the first set temperature T1c set in advance or more, and if it is determined to be lower (NO), the multistate temperature rise injection composed of the pre injection, the main injection, and the after injection is performed in in-cylinder combustion control at Step S12, while if the first temperature T1 is determined to be at the first set temperature T1c or more (YES) in the determination at Step S11, the post injection control of performing the post injection in addition to the multistage temperature rise injection is executed at Step S13. In the post injection control, the post injection is feedback-controlled so that the temperature T2 detected by the second exhaust gas temperature sensor 27 on the downstream side of the exhaust gas purification device 20 becomes the second set temperature T2c set in advance. This Step S11 to Step S13 constitutes the first control (Step S10).

Then, at Step S21 next to Step S13, it is determined whether or not the second temperature T2 is able to maintain the second set temperature T2c by the first control, and when it is not able to maintain it (NO), the routine returns to Step S13, and when it is able to maintain it (YES), the routine proceeds to Step S22, and the multistage temperature rise injection and the post injection are finished. The Step S21 and Step S22 constitute the second control (Step S20). Whether or not the second temperature T2 is able to maintain the second set temperature T2c can be determined on the basis of whether the second temperature T2 is within a predetermined temperature width range set in advance centered on the second set temperature T2c continuously for a predetermined period of time or more, for example.

That is, during cooling when the temperature Tw of the cooling water of the engine 10 is at the cooling water set temperature (40° C., for example) Twc or less, the multistage injection control is started so as to raise the temperature of the exhaust gas G. This multistage temperature rise injection is injection control delayed (retard) from normal injection, and pre injection, main injection, and after injection are performed continuously after the top dead center, combustion in the cylinder is continued and the gas is discharged with the in-cylinder combustion temperature kept at a high temperature, and the temperature of the exhaust gas G is raised. In this multistage temperature rise injection, concentrations of HC and CO in the exhaust gas G become high, but since they can be adsorbed or oxidized by the pre-oxidation catalyst 25, HC and CO can be purified.

Moreover, when the first temperature T1 of the exhaust gas G on the upstream side of the pre-oxidation catalyst 25 reaches the first set temperature T1c which is the catalyst activation temperature (approximately 200° C.) of the pre-oxidation catalyst 25, the post injection is further added, and the temperature of the pre-oxidation catalyst 25 is raised, and feedback control is executed so that the second temperature T2 of the exhaust gas G on the downstream of the pre-oxidation catalyst 25 becomes the second set temperature T2c which is the temperature (approximately 300° C.) at which the catalyst activity of the NOx purification catalyst 23 is favorable.

Then, when warm-up (warming) of the engine 10 progresses, the second temperature T2 of the exhaust gas G rises, and when the second temperature T2 of the exhaust gas G can maintain the temperature (approximately 300° C.) at which the catalyst activity of the NOx purification catalyst 23 is favorable without the multistage temperature rise injection or post injection, the control is finished.

According to this method, the temperature of the NOx purification catalyst 23 can be raised earlier than usual, and the NOx purification rate can be improved, which is a merit.

On the other hand, the method for regeneration of the DPF 22 is a method for promoting the DPF regeneration of the DPF 22 and is performed when the operation state of the engine 10 is in the low load state set in advance. In this method, the first set temperature T1c is set to the catalyst activation temperature of the pre-stage oxidation catalyst 25, and the second set temperature T2c is set to the temperature at which the fuel F injected from the HC injection nozzle 24 is decomposed.

This method is an exhaust gas purification method in which the exhaust gas G discharged from the engine 10 is made to pass through the exhaust gas purification device 20 including the pre-stage oxidation catalyst 21 and the DPF 22 for purification, and the exhaust gas G is made to pass through the pre-oxidation catalyst 25 before passing through the exhaust gas purification device 20.

At the same time, in accordance with the control flow as illustrated in FIG. 3, it is determined at Step S11 whether or not the first temperature T1 detected by the first exhaust gas temperature sensor 26 on the upstream side of the exhaust gas purification device 20 is lower than the first set temperature T1c set in advance, and if it is determined to be lower (NO), the multistage temperature rise injection composed of the pre injection, the main injection, and the after injection is performed in the in-cylinder combustion control at Step S12, while if the first temperature T1 is determined to be at the first set temperature T1c or more (YES) in the determination at Step S11, the post injection control of performing the post injection in addition to the multistage temperature rise injection is executed at Step S13. In this post injection, the post injection is feedback-controlled so that the second temperature T2 detected by the second exhaust gas temperature sensor 27 on the downstream side of the exhaust gas purification device 20 becomes the second set temperature T2c set in advance. This Step S11 to Step S13 constitutes the first control (Step S10).

Then, at Step S31 next to Step S13, it is determined whether or not the second temperature T2 is able to maintain the second set temperature T2c by the first control, and if it is not able to maintain it (NO), the routine returns to Step S13, and when it is able to maintain it (YES), the exhaust pipe fuel injection is performed from the HC injection nozzle 24 provided on the upstream of the exhaust gas purification device 20 at Step S32, and the exhaust pipe fuel injection is feedback-controlled so that the third temperature T3 detected by the third exhaust gas temperature sensor 28 arranged on the upstream of the DPF 22 becomes the third set temperature T3c.

At the subsequent Step S33, during execution of this feedback control, it is determined whether or not the PM (particulate matter) collected by the DPF 22 has been burned/removed, and if it is determined that the PM collected by the DPF 22 has not been burned/removed (NO), the routine returns to Step S32, while if it is determined that the PM collected by the DPF 22 has been burned/removed (YES), the multistage temperature rise injection and the post injection are finished at the subsequent Step S34. This Step S31 to Step S34 constitutes the third control (Step S30).

Whether or not the PM has been burned/removed can be determined on the basis of whether or not regeneration time which is total time of the exhaust pipe fuel injection has reached regeneration target time set in advance or whether or not a differential pressure value before and after the DPF 22 has fallen to a differential pressure target value or less or the like.

That is, when the PM regeneration is started at a low load, the multistage temperature rise injection is started so as to raise the temperature of the exhaust gas G. In this multistage temperature rise injection, concentrations of HC and CO in the exhaust gas G become high, but by means of adsorption and oxidation by the small-sized pre-oxidation catalyst 25, HC and CO can be purified.

When the first temperature T1 of the exhaust gas G on the upstream of the pre-oxidation catalyst 25 reaches the first set temperature T1c which is the catalyst activation temperature (approximately 200° C.) of the pre-oxidation catalyst 25, the post injection is further added, the unburned HC supplied by this post injection is oxidized by the pre-oxidation catalyst 25, temperature rise of the pre-oxidation catalyst 25 and temperature rise of the exhaust gas G passing therethrough are performed by this oxidation heat, and feedback control is executed so that the second temperature T2 of the exhaust gas G on the downstream of the pre-oxidation catalyst 25 becomes the second set temperature T2c which is the temperature (approximately 300° C.) at which the fuel F injected from the HC injection nozzle 24 is decomposed.

Subsequently, the exhaust pipe fuel injection is performed, the fuel F supplied by the exhaust pipe fuel injection is oxidized by the pre-stage oxidation catalyst 21, temperature rise of the pre-stage oxidation catalyst 21 and temperature rise of the exhaust gas G passing therethrough are performed by this oxidation heat, and feedback control is executed so that the temperature of the DPF 22 is raised by this exhaust gas G whose temperature has been raised, and the third temperature T3 of the exhaust gas G on the upstream of the DPF 22 becomes the third set temperature T3c which is a temperature (approximately 500 to 600° C.) at which the PM regeneration is performed favorably. This feedback control is finished when it is determined that the PM has been burned/removed.

Merits of this method include an effect of preventing white smoke caused by the HC slip in the exhaust pipe fuel injection, since the temperature rise of the DPF 22 is possible earlier than usual.

According to the exhaust gas purification system 1 and the exhaust gas purification method described above, in the arrangement in which the small-sized pre-oxidation catalyst 25 is installed on the upstream of the exhaust gas purification device 20 composed of the pre-stage oxidation catalyst 21, the DPF 22, and the NOx purification catalyst 23, and the HC injection nozzle 24 is installed on the downstream, by controlling the multistage temperature rise injection, the post injection, the exhaust pipe fuel injection and the like, HC slip can be prevented by adsorbing and oxidizing HC in the multistage temperature rise injection by the pre-oxidation catalyst 25, and the multistage temperature rise injection is made possible even in the cooling and thus, an effect of improving the NOx purification rate of the exhaust gas during cooling can be obtained.

Similarly, by reducing the HC slip at DPF regeneration in the low load state and by early raising the second temperature T2 of the exhaust gas G to reach the second set temperature T2c which is a temperature at which the fuel F injected from the HC injection nozzle 24 on the downstream is decomposed in an early stage, the early temperature rise effect at the DPF regeneration and the HC slip prevention effect can be obtained.

Figure 4:
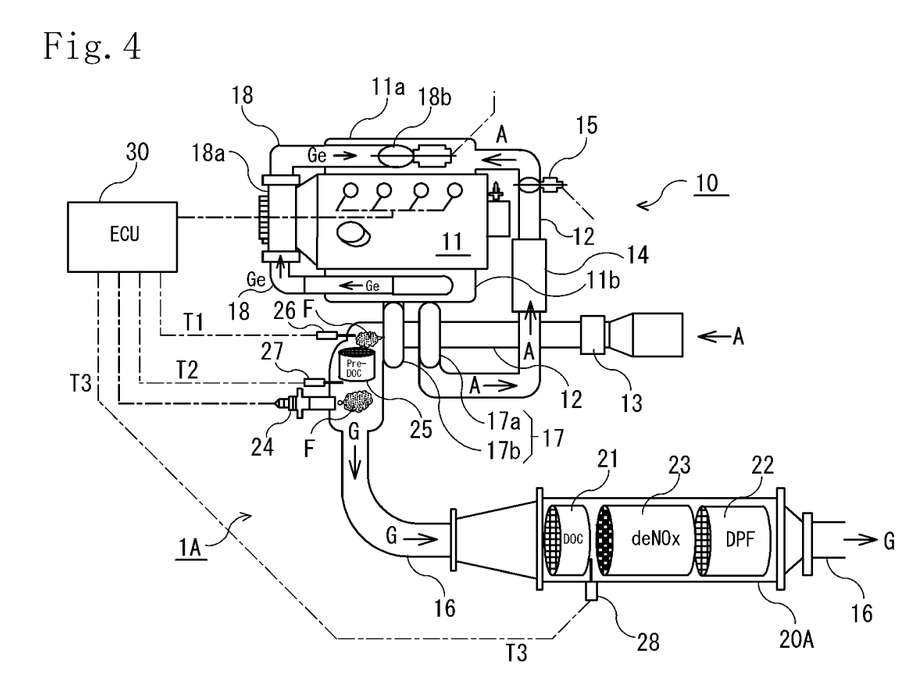
FIG. 4 is a diagram illustrating a configuration of an exhaust gas purification system of a second embodiment according to the present invention.

Subsequently, an exhaust gas purification system 1A in a second embodiment illustrated in FIG. 4 will be described. In the exhaust gas purification system 1A of the second embodiment, an exhaust gas purification device 20A is configured such that the pre-stage oxidation catalyst 21, the NOx purification catalyst 23, and the DPF 22 are arranged from the upstream side. That is, it is different from the exhaust gas purification system 1 in the first embodiment in a point that the NOx purification catalyst 23 is arranged on the upstream side of the DPF 22. The other points including configuration of the control device 30 including the first control, the second control, and the third control are the same as those of the exhaust gas purification system 1 and the exhaust gas purification method of the first embodiment, and similar working effects can be exerted.

Figure 5:
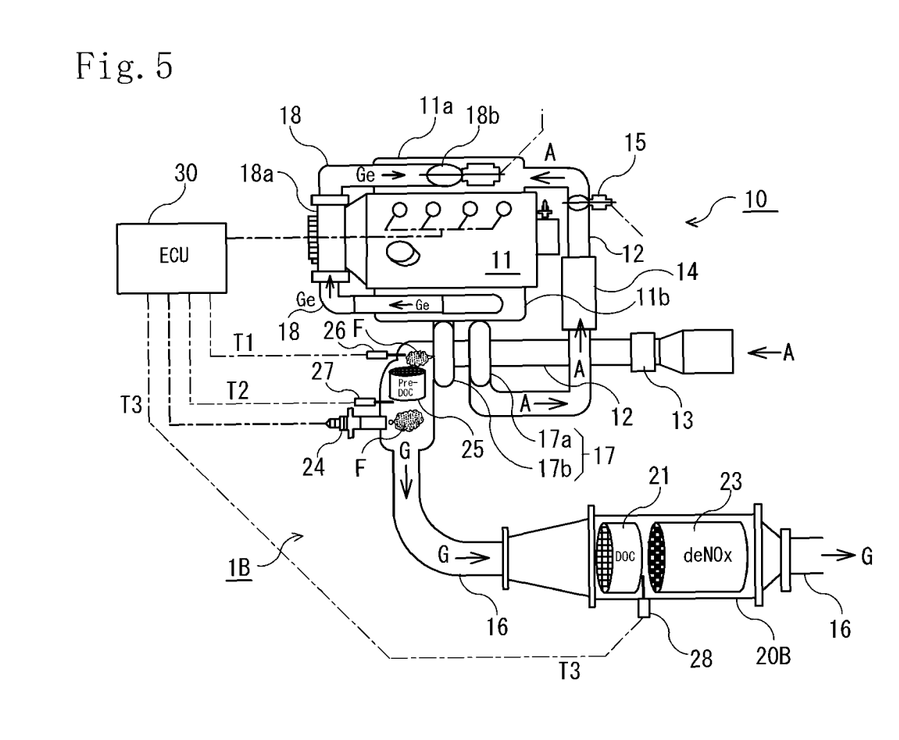
FIG. 5 is a diagram illustrating a configuration of an exhaust gas purification system of a third embodiment according to the present invention.

Subsequently, an exhaust gas purification system 1B in a third embodiment illustrated in FIG. 5 will be described. In the exhaust gas purification system 1B of the third embodiment, an exhaust gas purification device 20B is configured such that the pre-stage oxidation catalyst 21 and the NOx purification catalyst 23 are arranged from the upstream side. That is, it is different from the exhaust gas purification system 1 in the first embodiment in a point that the DPF 22 is not provided, and the control device 30 includes the first control and the second control but does not include the third control. The other configurations are the same as those of the exhaust gas purification system 1 and the exhaust gas purification method of the first embodiment, and working effects by the first control and the second control can be exerted.

Figure 6:
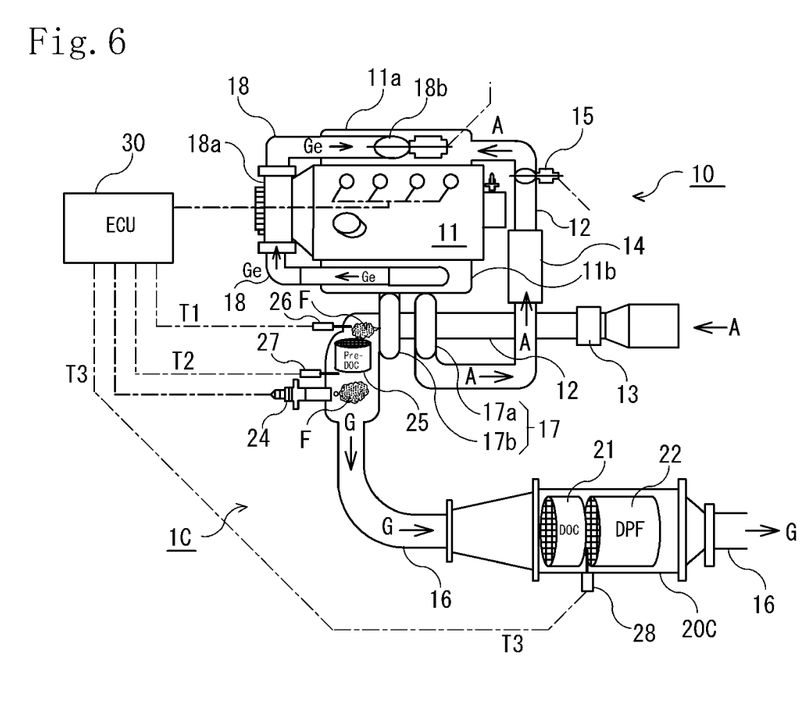
FIG. 6 is a diagram illustrating a configuration of an exhaust gas purification system of a fourth embodiment according to the present invention.

Subsequently, an exhaust gas purification system 1C in a fourth embodiment illustrated in FIG. 6 will be described. In the exhaust gas purification system 1C of the fourth embodiment, an exhaust gas purification device 20C is configured such that the pre-stage oxidation catalyst 21 and the DPF 22 are arranged from the upstream side. That is, it is different from the exhaust gas purification system 1 in the first embodiment in a point that the NOx purification catalyst 23 is not provided, and the control device 30 includes the first control and the third control but does not include the second control in configuration. The other configurations are the same as those of the exhaust gas purification system 1 and the exhaust gas purification method of the first embodiment, and working effects by the first control and the third control can be exerted.

Figure 7:
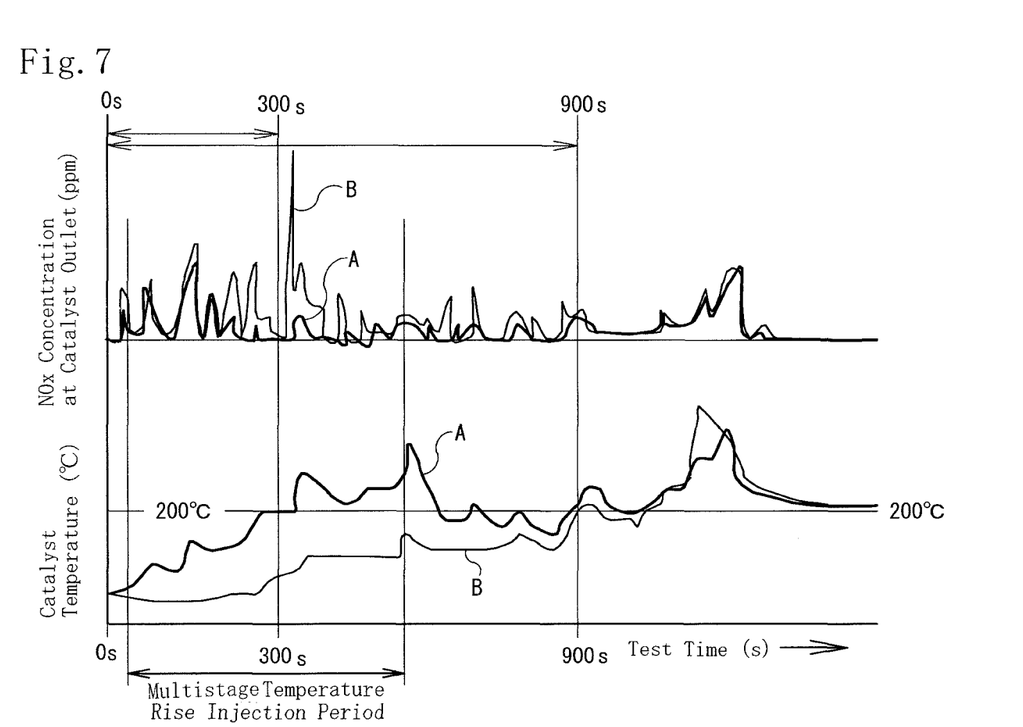
FIG. 7 is a diagram illustrating an example of a time series of the catalyst temperature at an outlet position of a pre-oxidation catalyst and a time series of the NOx concentration at an outlet position of an NOx purification catalyst in the embodiment and a prior-art example.

FIG. 7 illustrates an experiment result of an example A in which the first control and the second control are executed in the exhaust gas purification system 1 of the first embodiment and a comparative example B in which they are not executed. A catalyst temperature (° C.) on a lower stage in FIG. 7 is a temperature at an outlet position of the pre-oxidation catalyst (Pre-DOC) 25, and though it took 900 s (seconds) to reach 200° C. in the comparative example B, it took 300 s to reach 200° C. in the example A, and it is known that the temperature rise promotion effect of the exhaust gas G by the pre-oxidation catalyst 25 and the first control is great.

Moreover, a catalyst outlet NOx concentration on an upper stage in FIG. 7 is an NOx concentration (ppm) at an outlet position of the NOx purification catalyst 23, and it is known that the NOx concentration is extremely smaller in the example A with the multistage temperature rise injection than in the comparative example B without the multistage temperature rise injection.

The exhaust gas purification system and the exhaust gas purification method of the present invention can improve the low-temperature characteristics of the exhaust gas purification device including the pre-stage oxidation catalyst (DOC) and at least one of the NOx purification catalyst and the DPF, improve the NOx purification characteristic of the NOx purification catalyst with respect to the low-temperature exhaust gas, and prevent generation of white smoke caused by HC slip in the NOx purification at a low temperature, the NOx regeneration, and the PM regeneration, and thus, it can be used as the exhaust gas purification system and the exhaust gas purification method of an internal combustion engine such as a diesel engine mounted on an automobile and the like.

The invention claimed is:

1. An exhaust gas purification system, comprising:
an exhaust gas purification device including a pre-stage oxidation catalyst and an NOx purification catalyst provided in an exhaust passage of an internal combustion engine;
a control device configured to control an operation of the internal combustion engine; and
a first exhaust gas temperature sensor, a pre-oxidation catalyst, and a second exhaust gas temperature sensor arranged in order from an upstream side in the exhaust passage on an upstream side of the exhaust gas purification device,
wherein the control device is configured to—
execute a first control to perform multistage temperature rise injection by in-cylinder combustion control, when a first temperature detected by the first exhaust gas temperature sensor is lower than a first set temperature set in advance,
perform post injection, in addition to the multistage temperature rise injection, when the first temperature rises to the first set temperature or more, and
feedback control the post injection so that a second temperature detected by the second exhaust gas temperature sensor becomes a second set temperature set in advance,
wherein the first set temperature is set to a catalyst activation temperature of the pre-oxidation catalyst and the second set temperature is set to a temperature which is at least a catalyst activation temperature of the NOx purification catalyst and within a temperature range in which a NOx purification rate is optimized, and
wherein the control device is further configured to—
execute the first control when a temperature of cooling water of the internal combustion engine is lower than a cooling water set temperature set in advance, and
finish the multistage temperature rise injection and the post injection, when the second temperature is able to maintain the second set temperature as a result of the execution of the first control.

2. An exhaust gas purification system, comprising:
an exhaust gas purification device including a pre-stage oxidation catalyst and a diesel particulate filter provided in an exhaust passage of an internal combustion engine;
a control device configured to control an operation of the internal combustion engine;
a first exhaust gas temperature sensor, a pre-oxidation catalyst, and a second exhaust gas temperature sensor arranged in order from an upstream side in the exhaust passage on an upstream side of the exhaust gas purification device,
wherein the control device is configured to—
execute a first control to perform multistage temperature rise injection by in-cylinder combustion control, when a first temperature detected by the first exhaust gas temperature sensor is lower than a first set temperature set in advance,
perform post injection, in addition to the multistage temperature rise injection, when the first temperature rises to the first set temperature or more, and
feedback control the post injection so that a second temperature detected by the second exhaust gas temperature sensor becomes a second set temperature set in advance; and
an exhaust pipe fuel injection device and a third exhaust gas temperature sensor for detecting a third temperature of exhaust gas flowing into the diesel particulate filter arranged in the exhaust passage on an upstream side of the diesel particulate filter,
wherein the first set temperature is set to a catalyst activation temperature of the pre-oxidation catalyst, the second set temperature is set to a temperature at which fuel injected from the exhaust pipe fuel injection device is decomposed, and a third set temperature is set to a temperature at which particulate matter collected by the diesel particulate filter becomes combustible, and
wherein the control device is further configured to—
execute the first control, when an operation state of the internal combustion engine is in a low load state set in advance, and, when the second temperature is able to maintain the second set temperature as a result of the execution of the first control,
start the fuel injection from the exhaust pipe fuel injection device, perform feedback control of the post injection so that the third temperature detected by the third exhaust gas temperature sensor becomes the third set temperature, determine whether or not the particulate matter collected by the diesel particulate filter during execution of the feedback control has been combusted, and finish the multistage temperature rise injection and the post injection, when having determined that the particulate matter collected by the diesel particulate filter has been combusted.

3. An exhaust gas purification method for purifying an exhaust gas discharged from an internal combustion engine by passing the exhaust gas through an exhaust gas purification device including a pre-stage oxidation catalyst and an NOx purification catalyst, the method comprising:

passing the exhaust gas through the exhaust gas purification device after passing the exhaust gas through a pre-oxidation catalyst;

executing a first control which performs multistage temperature rise injection by in-cylinder combustion control, when a first temperature detected by a first exhaust gas temperature sensor on an upstream side of the exhaust gas purification device is lower than a first set temperature set in advance, performing post injection, in addition to the multistage temperature rise injection, when the first temperature rises to the first set temperature or more;

feedback controlling the post injection so that a second temperature detected by a second exhaust gas temperature sensor on a downstream side of the exhaust gas purification device becomes a second set temperature set in advance;

setting the first set temperature to a catalyst activation temperature of the pre-oxidation catalyst, and the second set temperature to a temperature which is at least a catalyst activation temperature of the NOx purification catalyst and within a temperature range in which a NOx purification rate is optimized;

executing the first control, when a temperature of cooling water of the internal combustion engine is lower than a cooling water set temperature set in advance; and finishing the multistage temperature rise injection and the post injection, when the second temperature is able to maintain the second set temperature as a result of the execution of the first control.

4. An exhaust gas purification method for purifying an exhaust gas discharged from an internal combustion engine by passing the exhaust gas through an exhaust gas purification device including a pre-stage oxidation catalyst and a diesel particulate filter, the method comprising:

passing the exhaust gas through the exhaust gas purification device after passing the exhaust gas through a pre-oxidation catalyst;

executing a first control which performs multistage temperature rise injection by in-cylinder combustion control, when a first temperature detected by a first exhaust gas temperature sensor on an upstream side of the exhaust gas purification device is lower than a first set temperature set in advance;

performing post injection, in addition to the multistage temperature rise injection, when the first temperature rises to the first set temperature or more;

feedback controlling the post injection so that a second temperature detected by a second exhaust gas temperature sensor on a downstream side of the exhaust gas purification device becomes a second set temperature set in advance;

setting the first set temperature to a catalyst activation temperature of the pre-oxidation catalyst, the second set temperature to a temperature at which fuel that has been injected from an exhaust pipe fuel injection device is decomposed, and a third set temperature to a temperature at which particulate matter collected by the diesel particulate filter becomes combustible;

executing the first control, when an operation state of the internal combustion engine is in a low load state set in advance;

starting the fuel injection from the exhaust pipe fuel injection device provided on an upstream of the exhaust gas purification device, when the second temperature is able to maintain the second set temperature as a result of the execution of the first control, feedback controlling the post injection so that a third temperature detected by a third exhaust gas temperature sensor arranged upstream of the diesel particulate filter becomes the third set temperature, determining whether or not the particulate matter collected by the diesel particulate filter during execution of the feedback control has been combusted; and finishing the multistage temperature rise injection and the post injection, when it is determined that the particulate matter collected by the diesel particulate filter has been combusted.

* * * * *